US012609023B2

(12) United States Patent
Odakura

(10) Patent No.: US 12,609,023 B2
(45) Date of Patent: Apr. 21, 2026

(54) VEHICLE CONTROL DEVICE

(71) Applicant: SUBARU CORPORATION, Tokyo (JP)

(72) Inventor: Satoshi Odakura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 18/480,150

(22) Filed: Oct. 3, 2023

(65) Prior Publication Data

US 2024/0046782 A1 Feb. 8, 2024

Related U.S. Application Data

(63) Continuation of application No. PCT/JP2022/016243, filed on Mar. 30, 2022.

(51) Int. Cl.

*G07C 5/04* (2006.01)
*G08G 1/01* (2006.01)
*G08G 1/052* (2006.01)

(52) U.S. Cl.

CPC ............ *G08G 1/0137* (2013.01); *G07C 5/04* (2013.01); *G08G 1/052* (2013.01)

(58) Field of Classification Search

CPC ....... B60W 2520/10; B60W 2520/105; B60W 2540/043; B60W 2540/30; B60W 2554/406; B60W 2554/802; B60W 2556/10; B60W 30/16; B60W 50/14;

(Continued)

(56) References Cited

U.S. PATENT DOCUMENTS 10,442,443 B1 * 10/2019 Li ......................... B60W 50/10
2012/0029801 A1 2/2012 Yano et al.

(Continued)

FOREIGN PATENT DOCUMENTS

JP 2005-186674 A 7/2005
JP 2006-31572 A 2/2006

(Continued)

OTHER PUBLICATIONS

Machine Translation of JP 2007148917 A obtained from Clarivate Analytics on Oct. 24, 2025 (Year: 2007).*

*Primary Examiner* — Fadey S. Jabr
*Assistant Examiner* — Michael J Herrera
(74) *Attorney, Agent, or Firm* — Rimon P.C.

(57) ABSTRACT

A vehicle control device mountable on a vehicle includes a warning device that warns a current driver of the vehicle, and a control system including a processor and a memory that are communicably coupled. The control system obtains, a numerical value indicating an acceleration operation and/or a deceleration operation for each past driver of the vehicle, and the numerical value as past operation data. When an occupant other than the current driver matches any past driver, the control system sets the past operation data of the any past driver as reference data. The control system obtains a numerical value indicating an acceleration operation and/or a deceleration operation by the current driver as current operation data, and controls the warning device to warn the current driver when the current operation data deviates from the reference data by an amount more than a warning threshold.

6 Claims, 17 Drawing Sheets

(58) Field of Classification Search
CPC ........ G07C 5/04; G08G 1/0137; G08G 1/052; G08G 1/16
See application file for complete search history.

(56) References Cited

U.S. PATENT DOCUMENTS

| | | | | |
|---|---|---|---|---|
| 2014/0313056 | A1* | 10/2014 | Pallotta ................. | H04W 4/023 340/901 |
| 2018/0149101 | A1* | 5/2018 | Watanabe ............. | B60W 30/19 |
| 2019/0019412 | A1* | 1/2019 | Roca ...................... | G08G 1/168 |
| 2019/0161088 | A1 | 5/2019 | Goto | |

FOREIGN PATENT DOCUMENTS

| | | | | |
|---|---|---|---|---|
| JP | 2007148917 | A | * | 6/2007 |
| JP | 2007-233731 | A | | 9/2007 |
| JP | 2012-33107 | A | | 2/2012 |
| JP | 2012-238257 | A | | 12/2012 |
| JP | 2019-098779 | A | | 6/2019 |

* cited by examiner

FIG. 6

| DRIVER (PAST DRIVER) | PAST OPERATION DATA | | | |
|---|---|---|---|---|
| | BRAKE OPERATION | | ACCELERATOR OPERATION | |
| | INTER-VEHICLE DISTANCE IN BRAKE OPERATION (DECELERATION TIMING) | VEHICLE DECELERATION | INTER-VEHICLE DISTANCE IN ACCELERATOR OPERATION (ACCELERATION TIMING) | VEHICLE ACCELERATION |
| 1 | … | … | … | … |
| 2 | … | … | … | … |
| 3 | … | … | … | … |
| 4 | … | … | … | … |
| ⋮ | | | | |
| N | … | … | … | … |

VEHICLE CONTROL DEVICE

CROSS REFERENCES TO RELATED APPLICATIONS

This application is continuation of International Application No. PCT/JP2022/016243, filed on Mar. 30, 2022, the entire contents of which are hereby incorporated by reference.

BACKGROUND

The disclosure relates to a vehicle control device mountable on a vehicle.

In general, an accelerator operation and a brake operation are performed differently by different drivers. In other words, different drivers depress the accelerator pedal and the brake pedal in different manners. Accordingly, techniques have been proposed for estimating the manner in which a driver who drives a vehicle depresses the accelerator pedal or the like to control the vehicle in accordance with the manner of depressing the accelerator pedal or the like or to give a warning about the manner of depressing the accelerator pedal or the like (see Japanese Unexamined Patent Application Publication No. 2007-233731, Japanese Unexamined Patent Application Publication No. 2006-31572, Japanese Unexamined Patent Application Publication No. 2012-33107, Japanese Unexamined Patent Application Publication No. 2012-238257, and Japanese Unexamined Patent Application Publication No. 2005-186674).

SUMMARY

An aspect of the disclosure provides a vehicle control device mountable on a vehicle. The vehicle control device includes a warning device and a control system. The warning device is configured to warn a current driver who is driving the vehicle about one or both of an acceleration operation and a deceleration operation. The control system is configured to control the warning device. The control system includes a processor and a memory communicably coupled to the processor. The control system is configured to obtain a numerical value indicating one or both of an acceleration operation and a deceleration operation for each of past drivers who drove the vehicle in past, and store the numerical value as past operation data. The control system is configured to, when an occupant other than the current driver matches a past driver among the past drivers, set the past operation data of the past driver as reference data. The control system is configured to obtain a numerical value indicating one or both of an acceleration operation and a deceleration operation by the current driver as current operation data. The control system is configured to control the warning device to warn the current driver when the current operation data deviates from the reference data by an amount more than a warning threshold in a situation in which a travel speed of the vehicle is lower than a vehicle speed threshold and an inter-vehicle distance between the vehicle and a preceding vehicle traveling in front of the vehicle is lower than a distance threshold.

An aspect of the disclosure provides a vehicle control device mountable on a vehicle. The vehicle control device includes a warning device and a control system. The warning device is configured to warn a current driver who is driving the vehicle about one or both of an acceleration operation and a deceleration operation. The control system is configured to control the warning device. The control system includes a processor and a memory communicably coupled to the processor. The control system is configured to obtain numerical value indicating one or both of an acceleration operation and a deceleration operation for each of past drivers who drove the vehicle in past, and store the numerical value as past operation data. The control system is configured to, when an occupant other than the current driver matches a past driver among the past drivers, set the past operation data of the past driver as reference data. The control system is configured to obtain a numerical value indicating one or both of an acceleration operation and a deceleration operation by the current driver as current operation data. The control system is configured to count a number of deviations. The number of deviations is a number of times the current operation data deviates from the reference data by an amount more than a warning threshold. The control system is configured to, when the number of deviations is equal to or more than a first number, control the warning device to provide a first warning to the current driver, and reset the number of deviations. The control system is configured to, when the number of deviations is equal to or more than a second number larger than the first number after the first warning is provided, control the warning device to provide a second warning to the current driver.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 6 is a diagram illustrating an overview of a database storing past operation data;

DETAILED DESCRIPTION

As described above in the background section, the manner of depressing the accelerator pedal or the brake pedal differs from person to person. In some cases, a driver who drives a vehicle depresses the accelerator pedal or the brake pedal in a different manner from an occupant of the vehicle. In such cases, the manner in which the driver depresses the accelerator pedal or the like may make the occupant feel uncomfortable. It is therefore desirable to reduce the uncomfortable feeling for the occupant even if the driver and the occupant depress the accelerator pedal or the like differently.

It is desirable to reduce the uncomfortable feeling for an occupant of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. As used herein, a driver who is currently driving a vehicle 11 is referred to as a "current driver" if necessary, and a driver who drove the vehicle 11 in the past is referred to as a "past driver" if necessary.

Vehicle Configuration

Figure 1:
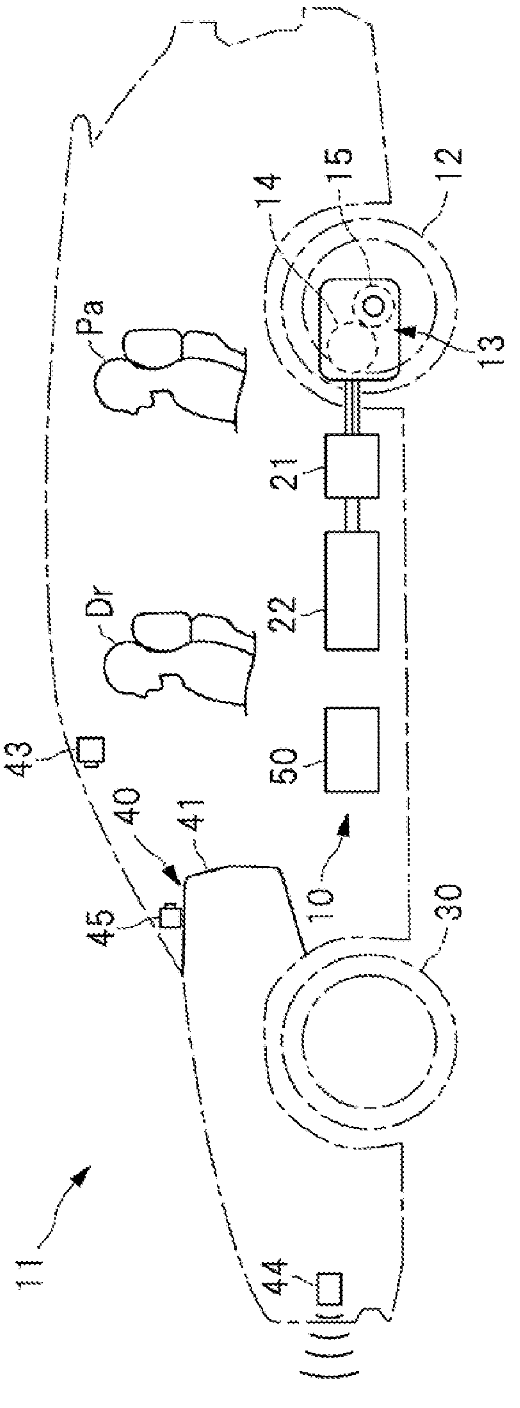
FIG. 1 is a diagram illustrating an example configuration of a vehicle provided with a vehicle control device according to an embodiment of the disclosure.
Figure 2:
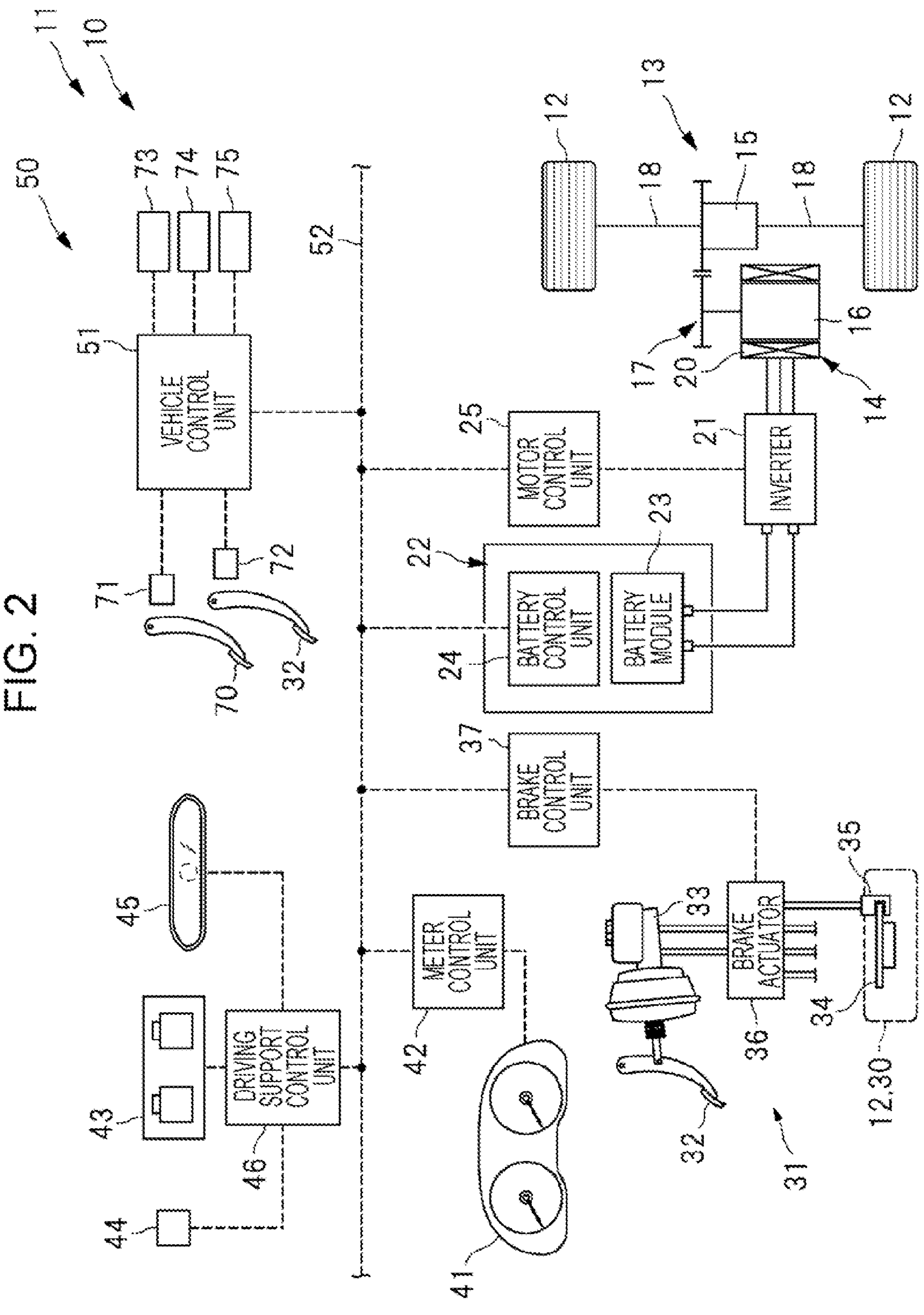
FIG. 2 is a diagram illustrating an example configuration of the vehicle control device.

FIG. 1 is a diagram illustrating an example configuration of the vehicle 11. The vehicle 11 is provided with a vehicle control device 10 according to an embodiment of the disclosure. FIG. 2 is a diagram illustrating an example configuration of the vehicle control device 10. As illustrated in FIG. 1, the vehicle 11 is provided with an electric axle 13 for driving rear wheels 12. The electric axle 13 includes a motor generator 14 and a differential mechanism 15. As illustrated in FIG. 2, the motor generator 14 has a rotor 16 to which the differential mechanism 15 is coupled via a gear train 17. The rear wheels 12 are coupled to axles 18 extending from the differential mechanism 15.

The motor generator 14 has a stator 20 to which an inverter 21 is coupled. The inverter 21 is coupled to a battery pack 22. The battery pack 22 includes a battery module 23 having battery cells, and a battery control unit 24 for monitoring charging and discharging of the battery module 23. The inverter 21 coupled to the motor generator 14 is coupled to a motor control unit 25 for controlling the inverter 21. The motor control unit 25 controls the inverter 21, which includes switching elements and the like, to control the energization of the stator 20 and control the motor torque of the motor generator 14.

The vehicle 11 is provided with a brake device 31 for braking front wheels 30 and the rear wheels 12. The brake device 31 includes a master cylinder 33 and calipers 35. The master cylinder 33 operates in conjunction with a brake pedal 32 and outputs brake fluid pressure. The calipers 35 brake disc rotors 34 of the front wheels 30 and the rear wheels 12. A brake actuator 36 is disposed between the master cylinder 33 and the calipers 35. The brake actuator 36 controls the brake fluid pressure to be supplied to the calipers 35. The brake actuator 36 is coupled to a brake control unit 37 for controlling the brake actuator 36.

As described below, the driver who drives the vehicle 11 can accelerate or decelerate the vehicle 11 by an accelerator operation and a brake operation. The vehicle 11 has a target driving force that is set in accordance with the accelerator operation by the driver, and the motoring torque of the motor generator 14 is controlled to achieve the target driving force. The vehicle 11 has a target braking force that is set in accordance with the brake operation by the driver, and the regenerative torque of the motor generator 14 and the braking force of the brake device 31 are controlled to achieve the target braking force. As described above, the acceleration of the vehicle 11 (hereafter referred to as "vehicle acceleration") can be controlled by the accelerator operation by the driver, and the deceleration of the vehicle 11 (hereafter referred to as "vehicle deceleration") can be controlled by the brake operation by the driver. The term "vehicle deceleration", as used herein, means the absolute value of the vehicle acceleration in the negative direction.

As illustrated in FIG. 1, an instrument panel 40 is disposed at the front of the interior cabin of the vehicle 11. In other words, the instrument panel 40 is disposed in front of a driver's seat and a front occupant's seat. The instrument panel 40 includes a meter display (warning device) 41 that displays various kinds of information to the current driver who is driving. As illustrated in FIG. 2, the meter display 41 is coupled to a meter control unit 42. The display of the meter display 41 is controlled by the meter control unit 42. The meter display 41 may be a liquid crystal panel or an organic electroluminescent (EL) panel, for example.

The vehicle 11 is provided with a front camera 43 and a front radar 44. The front camera 43 captures an image of a scene in front of the vehicle 11. The front radar 44 detects an obstacle in front of the vehicle 11. The vehicle 11 is further provided with a monitoring camera 45. The monitoring camera 45 detects a driver Dr and an occupant Pa. The front camera 43, the front radar 44, and the monitoring camera 45 are coupled to a driving support control unit 46. The driving support control unit 46 detects the inter-vehicle distance between the vehicle 11 and a preceding vehicle 100 (see FIG. 5) traveling in front of the vehicle 11, based on image data and distance data of the front camera 43 and the front radar 44. Further, the driving support control unit 46 identifies the driver Dr and the occupant Pa, based on image data of the monitoring camera 45. Examples of the monitoring camera 45 include an infrared camera and an optical camera.

Control System

As illustrated in FIG. 2, the vehicle 11 is provided with a control system 50 for controlling the electric axle 13, the meter display 41, and the like. The control system 50 includes electronic control units. The electronic control units of the control system 50 include the battery control unit 24, the motor control unit 25, the brake control unit 37, the meter control unit 42, and the driving support control unit 46. The electronic control units of the control system 50 further include a vehicle control unit 51 that outputs control signals to the control units 24, 25, 37, 42, and 46. The control units 24, 25, 37, 42, 46, and 51 are communicably coupled to each other via an in-vehicle network 52 such as a controller area network (CAN).

Figure 3:
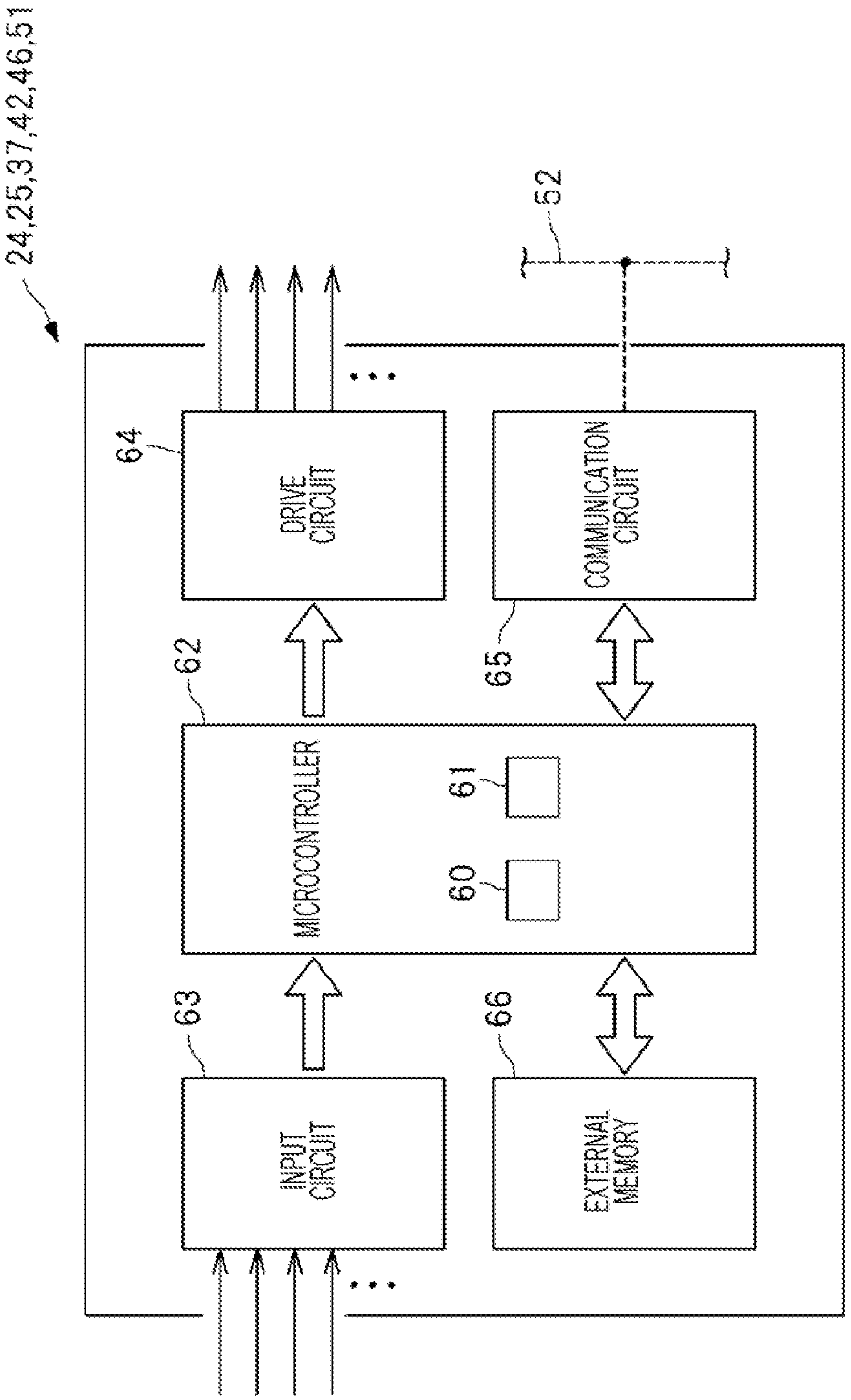
FIG. 3 is a diagram illustrating an example of a basic structure of control units.

FIG. 3 is a diagram illustrating an example of a basic structure of the control units 24, 25, 37, 42, 46, and 51. As illustrated in FIG. 3, each of the control units 24, 25, 37, 42, 46, and 51 includes a microcontroller 62. The microcontroller 62 has a processor 60 and a main memory (memory) 61, for example. The main memory 61 stores a predetermined program. The program is executed by the processor 60. The processor 60 and the main memory 61 are communicably coupled to each other. The microcontroller 62 may have multiple processors 60. The microcontroller 62 may have multiple main memories 61.

Each of the control units 24, 25, 37, 42, 46, and 51 further includes an input circuit 63, a drive circuit 64, a communication circuit 65, and an external memory 66, for example. The input circuit 63 converts signals input from various sensors into signals that can be input to the microcontroller 62. The drive circuit 64 generates drive signals for various devices, such as the electric axle 13, based on a signal output from the microcontroller 62. The communication circuit 65 converts the signal output from the microcontroller 62 into a communication signal directed to another control unit. The communication circuit 65 further converts a communication signal received from another control unit into a signal that can be input to the microcontroller 62. The external memory 66 stores programs, various data, and so on. Examples of the external memory 66 include a nonvolatile memory.

The vehicle control unit 51 sets operation goals for the electric axles 13, the brake devices 31, the meter display 41, and the like, based on information input from the control units 24, 25, 37, 42, and 46 and various sensors described below. The vehicle control unit 51 generates control signals corresponding to the operation goals for the electric axles 13, the brake device 31, the meter display 41, and the like, and outputs the control signals to the control units 24, 25, 37, 42, and 46. The vehicle control unit 51 is coupled to sensors including an accelerator sensor 71 and a brake sensor 72. The accelerator sensor 71 detects an amount of operation of an accelerator pedal 70. The brake sensor 72 detects an amount of operation of the brake pedal 32. The sensors coupled to the vehicle control unit 51 also include a vehicle speed sensor 73 and an acceleration sensor 74. The vehicle speed sensor 73 detects a vehicle speed that is the travel speed of the vehicle 11. The acceleration sensor 74 detects vehicle acceleration acting in the front-rear direction of the vehicle 11. The vehicle control unit 51 is further coupled to a start switch 75. The start switch 75 is operated by the driver Dr to activate the control system 50.

Operation Feedback Control

Operation feedback control for displaying a warning message for the accelerator operation or the brake operation will be described hereinafter. Operations for which a warning is generated include depressing the accelerator pedal 70 or the brake pedal 32 too early, and depressing the accelerator pedal 70 or the brake pedal 32 too late. Other operations for which a warning is generated include depressing the accelerator pedal 70 or the brake pedal 32 with too long a stroke, and depressing the accelerator pedal 70 or the brake pedal 32 with too short a stroke. As described below, the operation feedback control includes flag setting control for setting a feedback flag, and warning control for displaying a warning message on the meter display 41.

Flag Setting Control

Figure 4:
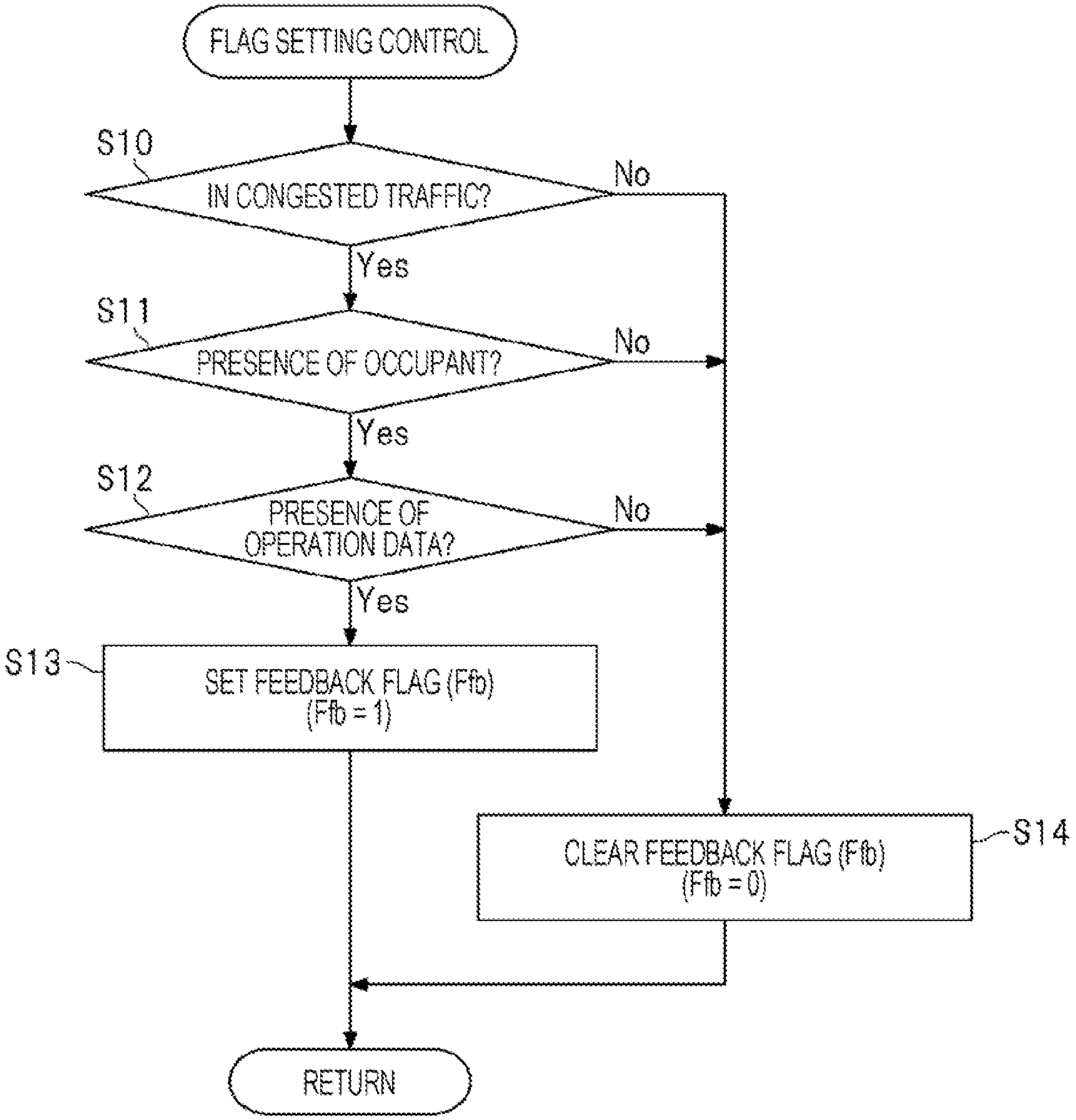
FIG. 4 is a flowchart illustrating an example of a procedure for executing flag setting control.
Figure 5:
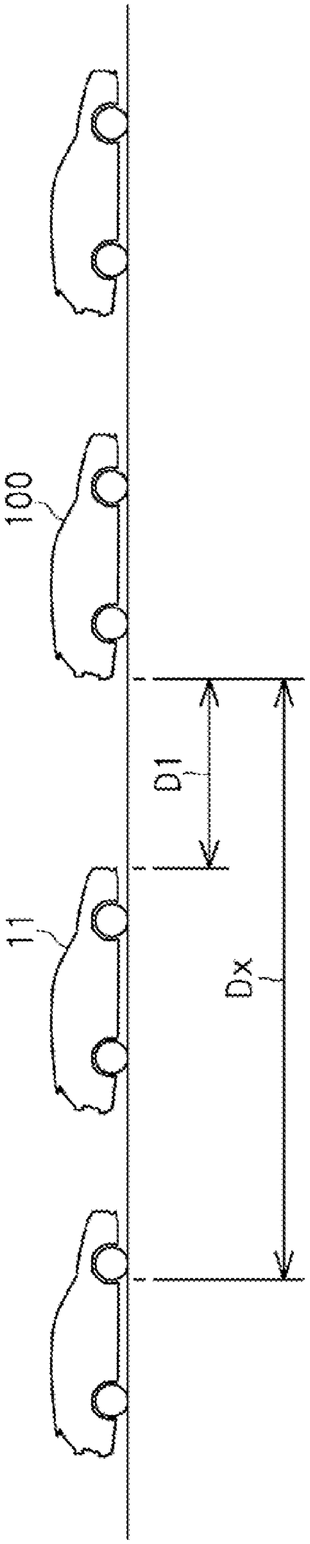
FIG. 5 is a diagram illustrating an example of vehicles in congested traffic.

FIG. 4 is a flowchart illustrating an example of a procedure for executing the flag setting control. FIG. 5 is a diagram illustrating an example of vehicles in congested traffic. FIG. 6 is a diagram illustrating an overview of a database storing past operation data. The steps of the flowchart illustrated in FIG. 4 present processing executed by the processor 60 of the control system 50. The flag setting control illustrated in FIG. 4 is executed by the control system 50 at intervals of a predetermined cycle after the start switch 75 is operated by the driver Dr and the control system 50 including the vehicle control unit 51 is activated.

As illustrated in FIG. 4, in step S10, it is determined whether the vehicle 11 is in congested traffic. Examples of the congested traffic include traffic in which, as illustrated in FIG. 5, an inter-vehicle distance D1 between the vehicle 11 and the preceding vehicle 100 is less than a predetermined distance Dx and a vehicle speed that is the travel speed of the vehicle 11 is less than a predetermined vehicle speed threshold. The vehicle 11 in congested traffic repeatedly starts and stops, and the driver Dr operates the accelerator pedal 70 or the brake pedal 32 with increased frequency.

If it is determined in step S10 that the vehicle 11 is in congested traffic, the process proceeds to step 511. In step 511, it is determined whether an occupant other than the driver Dr is in the vehicle 11. If it is determined in step S11 that an occupant is in the vehicle 11, the process proceeds to step 512. In step 512, it is determined whether a database of the control system 50 stores operation data related to the accelerator operation and the brake operation by the occupant. As illustrated in FIG. 6, the database of the control system 50 stores, for each past driver who drove the vehicle 11 in the past, numerical values indicating the accelerator operation and numerical values indicating the brake operation as past operation data. In other words, in step 512, it is determined whether the occupant in the vehicle 11 matches any one of the past drivers on the database. Details of the past operation data stored in the database will be described below.

If it is determined in step S12 that the database stores the past operation data of the occupant, that is, if it is determined in step S12 that the occupant in the vehicle 11 matches any one of the past drivers on the database, the process proceeds to step S13. In step S13, a feedback flag Ffb is set (Ffb=1). On the other hand, if it is determined in step S10 that the vehicle 11 is not in congested traffic, or if it is determined in step S11 that no occupant is in the vehicle 11, the process proceeds to step S14. In step S14, the feedback flag Ffb is cleared (Ffb=0). If it is determined in step S12 that the occupant in the vehicle 11 does not match any one of the past drivers on the database, the process proceeds to step S14. In step S14, the feedback flag Ffb is cleared (Ffb=0). The feedback flag Ffb is set when a precondition for executing warning control described below is satisfied. The feedback flag Ffb is cleared when the precondition for executing the warning control is not satisfied.

Warning Control

Figure 7:
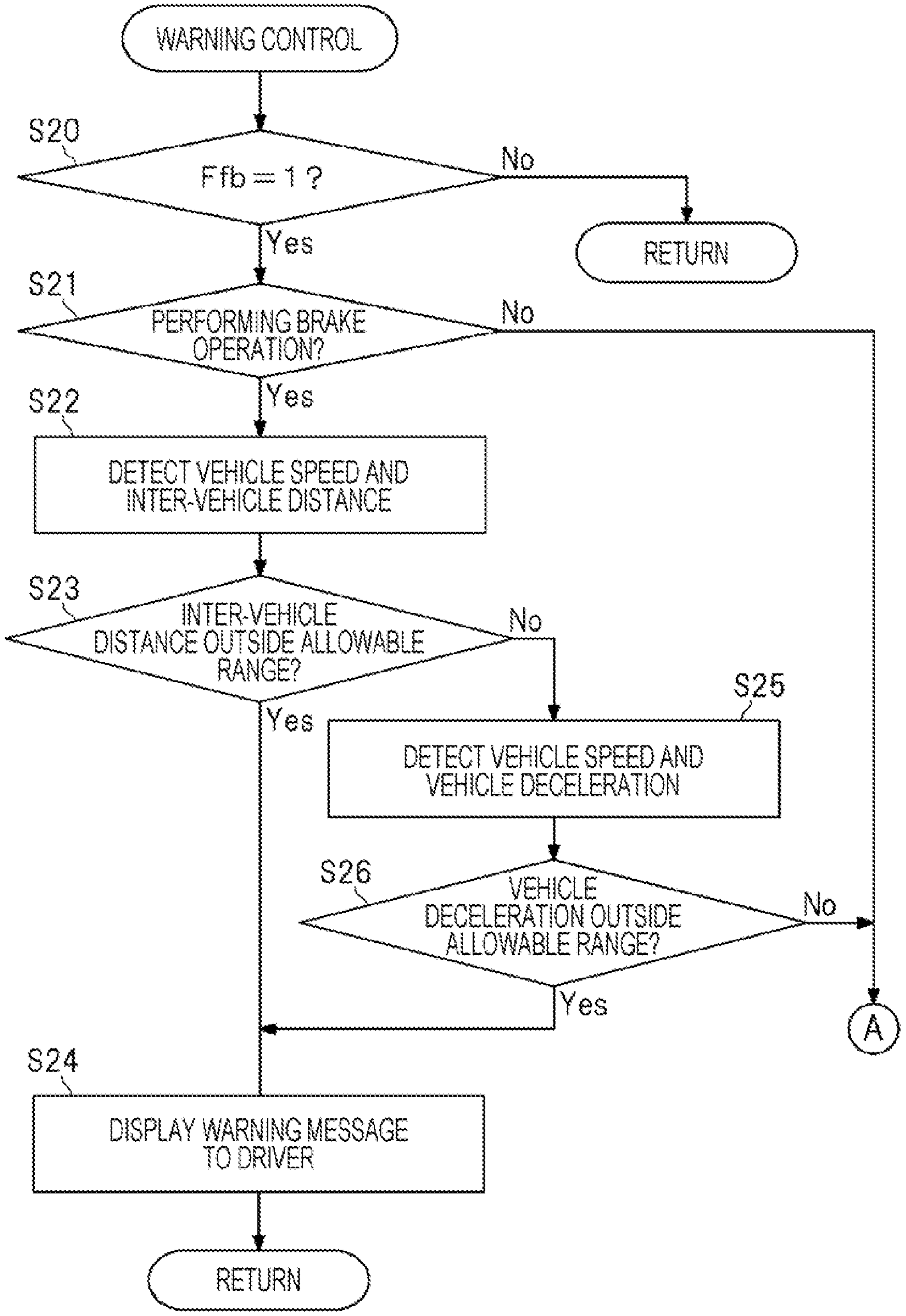
FIG. 7 is a flowchart illustrating an example of a procedure for executing warning control.
Figure 8:
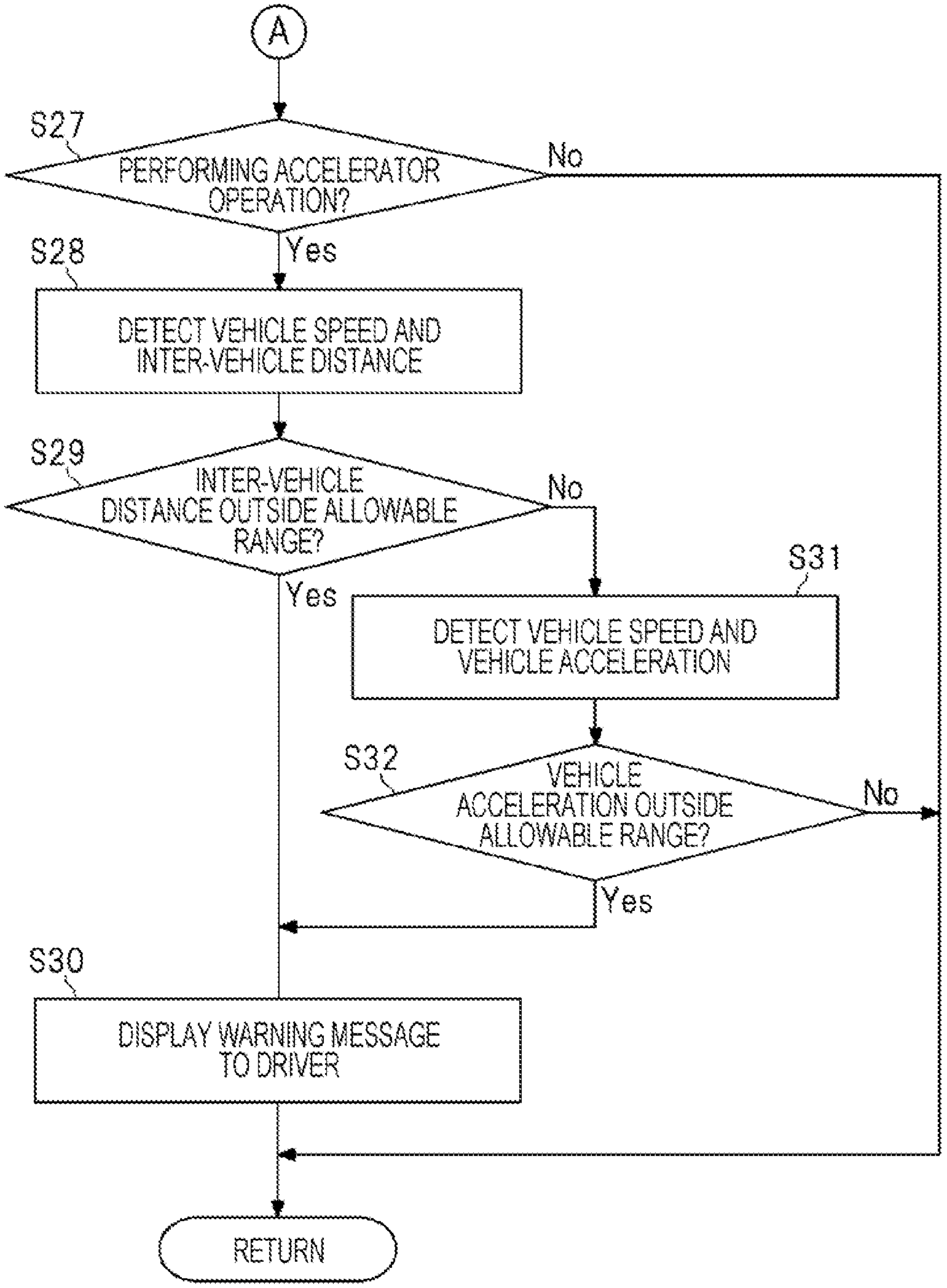
FIG. 8 is a flowchart illustrating the example of the procedure for executing warning control.

FIGS. 7 and 8 are flowcharts illustrating an example of a procedure for executing warning control. FIGS. 9, 10, 11, and 12 are diagrams illustrating an example of the past operation data stored in the database. The flowcharts illustrated in FIGS. 7 and 8 are put together at a point denoted by reference character A. The steps of the flowcharts illustrated in FIGS. 7 and 8 present processing executed by the processor 60 of the control system 50. The warning control illustrated in FIGS. 7 and 8 is executed by the control system 50 at intervals of a predetermined cycle after the start switch 75 is operated by the driver Dr and the control system 50 including the vehicle control unit 51 is activated.

Brake Operation

As illustrated in FIG. 7, in step S20, it is determined whether the feedback flag Ffb is set, that is, whether "Ffb=1" is satisfied. If it is determined in step S20 that the feedback flag Ffb is cleared, the routine is exited without execution of the warning control. On the other hand, if it is determined in step S20 that the feedback flag Ffb is set, the process proceeds to step S21. In step S21, it is determined whether the current driver (the driver Dr) performs a brake operation (deceleration operation). If it is determined in step S21 that the current driver is performing a brake operation, that is, if it is determined that the current driver has started depressing the brake pedal 32, the process proceeds to step S22. In step S22, the vehicle speed is detected, and the inter-vehicle distance between the vehicle 11 and the preceding vehicle 100 is also detected.

Then, in step S23, the inter-vehicle distance in the brake operation performed by the current driver, that is, the current operation data, is compared with past operation data related to an inter-vehicle distance for the occupant, who is the past driver. Then, it is determined whether the inter-vehicle distance indicated by the current operation data is outside an allowable range. If it is determined in step S23 that the inter-vehicle distance is outside the allowable range, that is, if the inter-vehicle distance indicated by the current operation data greatly deviates from that indicated by the past operation data of the occupant, the process proceeds to step S24. In step S24, a warning message is displayed to the current driver. In other words, a warning message for the current brake operation is displayed on the meter display 41.

Figure 9:
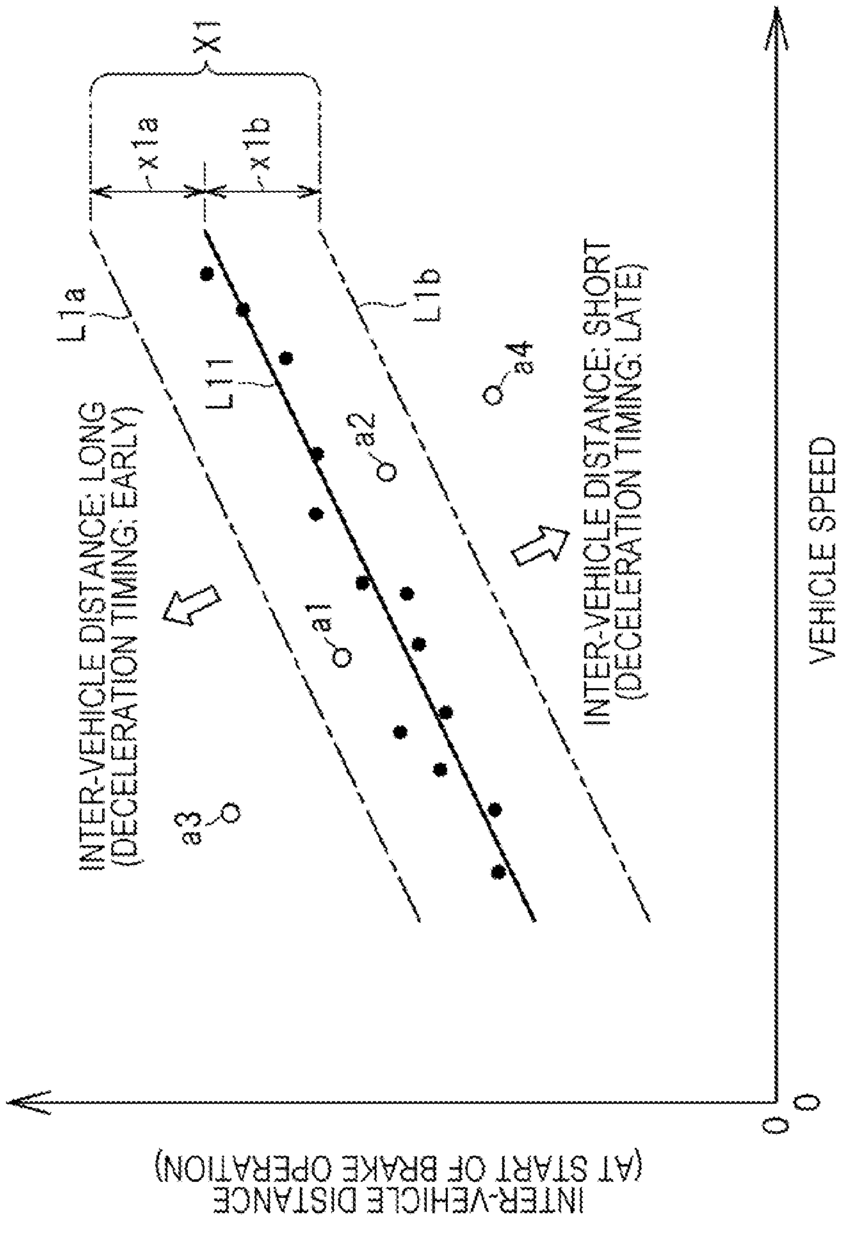
FIG. 9 is a diagram illustrating an example of past operation data stored in the database.

As indicated by black circles in FIG. 9, the database stores, for the past driver who is the occupant in the vehicle 11, data related to the vehicle speed and the inter-vehicle distance obtained at the time of depression of the brake pedal 32. In the illustrated example, an approximate straight line L11 is set as past operation data of the past driver, based on multiple pieces of data related to the vehicle speed and the inter-vehicle distance. Further, as indicated by the black circles in FIG. 9, when the past operation data includes a number of pieces of data larger than a specified number (for example, 10), the approximate straight line L11 indicating the past operation data is set as reference data to ensure the accuracy of determination using the database. In the illustrated example, an approximate straight line is used. As a non-limiting example, an approximate curve may be used. Further, an upper-limit line L1*a* and a lower-limit line L1*b* are set to define an allowable range X1 for preventing the occupant from feeling too uncomfortable. The upper-limit line L1*a* is obtained by adding a warning threshold x1*a* to the approximate straight line L11. The lower-limit line L1*b* is obtained by subtracting a warning threshold x1*b* from the approximate straight line L11.

As illustrated in FIG. 9, inter-vehicle distances (current operation data) a1 and a2 at the start of the brake operation fall within the allowable range X1 in a situation in which the current driver starts depressing the brake pedal 32 at an approximately equal inter-vehicle distance, that is, at an approximately equal deceleration timing, to the occupant, who is the past driver. In this case, it is determined that the brake operation does not make the occupant feel uncomfortable. Thus, no warning message is displayed on the meter display 41.

By contrast, an inter-vehicle distance (current operation data) a3 at the start of the brake operation is more than the upper-limit line L1*a* in a situation in which depression of the brake pedal 32 is started when the vehicle 11 is away from the preceding vehicle 100. In this situation, the current driver starts depressing the brake pedal 32 at a longer inter-vehicle distance, that is, at an earlier deceleration timing, than the occupant, who is the past driver. In other words, in this situation, the inter-vehicle distance (current operation data) a3, which is a numerical value indicating the brake operation by the current driver, deviates from the approximate straight line L11, which is the reference data, by an amount more than the warning threshold x1*a*. In this case, it is determined that the brake operation makes the occupant feel uncomfortable. A warning message such as "The brake operation seems to be slightly early. A later brake operation is recommended" is displayed on the meter display 41.

An inter-vehicle distance (current operation data) a4 at the start of the brake operation is less than the lower-limit line L1*b* in a situation in which depression of the brake pedal 32 is started after the vehicle 11 approaches the preceding vehicle 100. In this situation, the current driver starts depressing the brake pedal 32 at a shorter inter-vehicle distance, that is, at a later deceleration timing, than the occupant, who is the past driver. In other words, in this situation, the inter-vehicle distance (current operation data) a4, which is a numerical value indicating the brake operation by the current driver, deviates from the approximate straight line L11, which is the reference data, by an amount more than the warning threshold x1*b*. In this case, it is determined that the brake operation makes the occupant feel uncomfortable. A warning message such as "The brake operation seems to be slightly late. An earlier brake operation is recommended" is displayed on the meter display 41.

As illustrated in FIG. 7, if it is determined in step S23 that the inter-vehicle distance indicated by the current operation data is within the allowable range, the process proceeds to step S25 without displaying a warning message. In step S25, the vehicle speed and the vehicle deceleration are detected. As described above, the vehicle deceleration is the absolute value of the vehicle acceleration in the negative direction. Then, in step S26, the vehicle deceleration generated by the brake operation by the current driver, that is, the current operation data, is compared with the past operation data related to the vehicle deceleration generated by the occupant, who is the past driver. Then, it is determined whether the vehicle deceleration indicated by the current operation data is outside an allowable range. If it is determined in step S26 that the vehicle deceleration is outside the allowable range, that is, if the vehicle deceleration indicated by the current operation data greatly deviates from that indicated by the past operation data of the occupant, the process proceeds to step S24. In step S24, a warning message is displayed to the current driver. In other words, a warning message for the current brake operation is displayed on the meter display 41.

Figure 10:
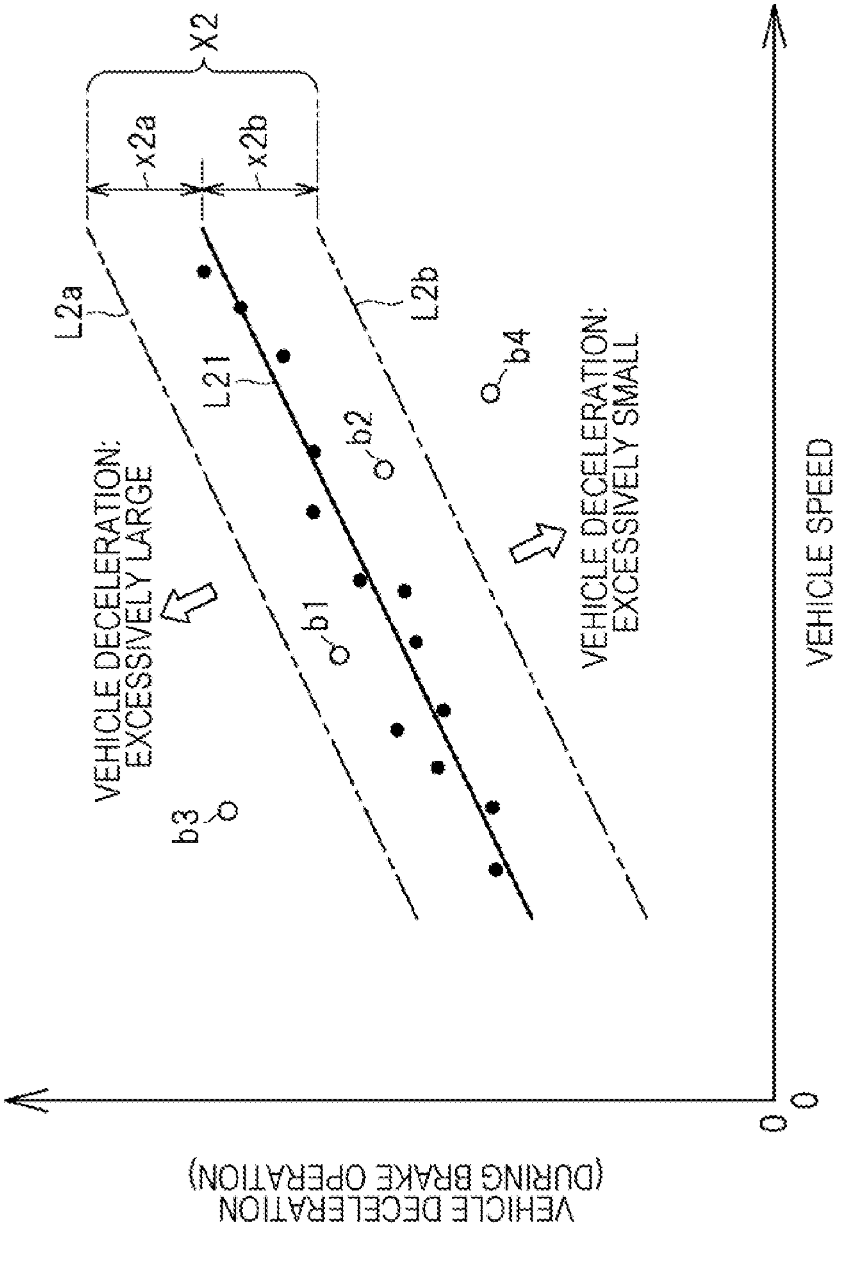
FIG. 10 is a diagram illustrating the example of the past operation data stored in the database.

As indicated by black circles in FIG. 10, the database stores, for the past driver who is the occupant in the vehicle 11, data related to the vehicle speed and the vehicle deceleration obtained at the time of depression of the brake pedal 32. In the illustrated example, an approximate straight line L21 is set as past operation data of the past driver, based on multiple pieces of data related to the vehicle speed and the vehicle deceleration. Further, as indicated by the black circles in FIG. 10, when the past operation data includes a number of pieces of data larger than a specified number (for example, 10), the approximate straight line L21 indicating the past operation data is set as reference data to ensure the accuracy of determination using the database. In the illustrated example, an approximate straight line is used. As a non-limiting example, an approximate curve may be used. Further, an upper-limit line L2*a* and a lower-limit line L2*b* are set to define an allowable range X2 for preventing the occupant from feeling too uncomfortable. The upper-limit line L2*a* is obtained by adding a warning threshold x2*a* to the approximate straight line L21. The lower-limit line L2*b* is obtained by subtracting a warning threshold x2*b* from the approximate straight line L21.

As illustrated in FIG. 10, vehicle decelerations (current operation data) b1 and b2 during the brake operation fall within the allowable range X2 in a situation in which the current driver depresses the brake pedal 32 while generating an approximately equal vehicle deceleration to the occupant, who is the past driver. In this case, it is determined that the brake operation does not make the occupant feel uncomfortable. Thus, no warning message is displayed on the meter display 41.

By contrast, a vehicle deceleration (current operation data) b3 during the brake operation is more than the upper-limit line L2*a* in a situation in which the vehicle deceleration generated by the brake operation by the current driver is excessively larger than the vehicle deceleration generated by the brake operation by the occupant, who is the past driver. In other words, in this situation, the vehicle deceleration (current operation data) b3, which is a numerical value indicating the brake operation by the current driver, deviates from the approximate straight line L21, which is the reference data, by an amount more than the warning threshold x2*a*. In this case, it is determined that the brake operation makes the occupant feel uncomfortable. A warning message such as “The brake operation seems to be slightly strong. A weaker brake operation is recommended” is displayed on the meter display 41.

A vehicle deceleration (current operation data) b4 during the brake operation is less than the lower-limit line L2*b* in a situation in which the vehicle deceleration generated by the brake operation by the current driver is excessively smaller than the vehicle deceleration generated by the brake operation by the occupant, who is the past driver. In other words, in this situation, the vehicle deceleration (current operation data) b4, which is a numerical value indicating the brake operation by the current driver, deviates from the approximate straight line L21, which is the reference data, by an amount more than the warning threshold x2*b*. In this case, it is determined that the brake operation makes the occupant feel uncomfortable. A warning message such as “The brake operation seems to be slightly weak. A stronger brake operation is recommended” is displayed on the meter display 41.

Accelerator Operation

As illustrated in FIG. 7, if it is determined in step S21 that the brake operation is not being performed, or if it is determined in step S26 that the vehicle deceleration is within the allowable range, the process proceeds to step S27 in FIG. 8. In step S27, it is determined whether the current driver performs an accelerator operation (or acceleration operation). If it is determined in step S27 that the current driver is performing the accelerator operation, that is, if it is determined that the current driver has started depressing the accelerator pedal 70, the process proceeds to step S28. In step S28, the vehicle speed is detected, and the inter-vehicle distance between the vehicle 11 and the preceding vehicle 100 is also detected.

Then, in step S29, the inter-vehicle distance in the accelerator operation performed by the current driver, that is, the current operation data, is compared with past operation data related to an inter-vehicle distance for the occupant, who is the past driver. Then, it is determined whether the inter-vehicle distance indicated by the current operation data is outside an allowable range. If it is determined in step S29 that the inter-vehicle distance is outside the allowable range, that is, if the inter-vehicle distance indicated by the current operation data greatly deviates from that indicated by the past operation data of the occupant, the process proceeds to step S30. In step S30, a warning message is displayed to the current driver. In other words, a warning message for the current accelerator operation is displayed on the meter display 41.

Figure 11:
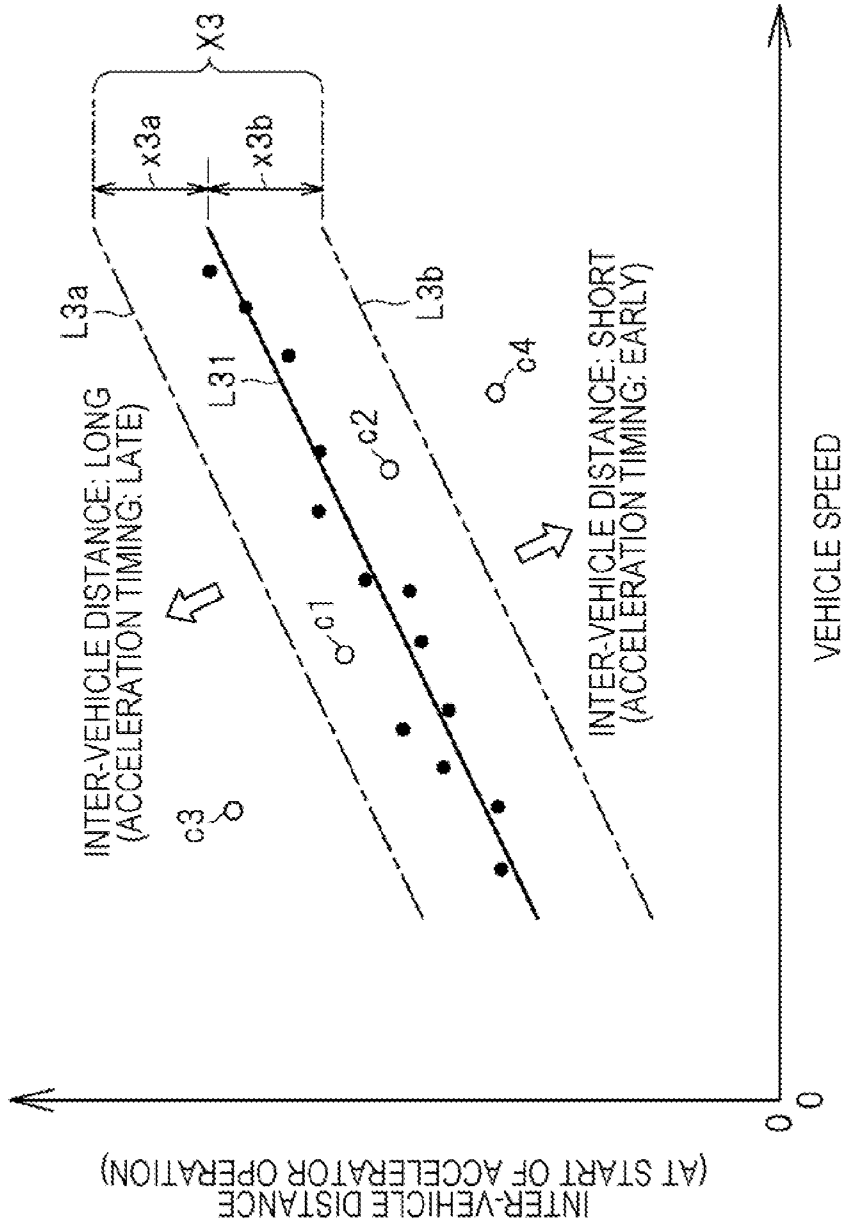
FIG. 11 is a diagram illustrating the example of the past operation data stored in the database.

As indicated by black circles in FIG. 11, the database stores, for the past driver who is the occupant in the vehicle 11, data related to the vehicle speed and the inter-vehicle distance obtained at the time of depression of the accelerator pedal 70. In the illustrated example, an approximate straight line L31 is set as past operation data of the past driver, based on multiple pieces of data related to the vehicle speed and the inter-vehicle distance. Further, as indicated by the black circles in FIG. 11, when the past operation data includes a number of pieces of data larger than a specified number (for example, 10), the approximate straight line L31 indicating the past operation data is set as reference data to ensure the accuracy of determination using the database. In the illustrated example, an approximate straight line is used. As a non-limiting example, an approximate curve may be used. Further, an upper-limit line L3*a* and a lower-limit line L3*b* are set to define an allowable range X3 for preventing the occupant from feeling too uncomfortable. The upper-limit line L3*a* is obtained by adding a warning threshold x3*a* to the approximate straight line L31. The lower-limit line L3*b* is obtained by subtracting a warning threshold x3*b* from the approximate straight line L31.

As illustrated in FIG. 11, inter-vehicle distances (current operation data) c1 and c2 at the start of the accelerator operation fall within the allowable range X3 in a situation in which the current driver starts depressing the accelerator pedal 70 at an approximately equal inter-vehicle distance, that is, at an approximately equal acceleration timing, to the occupant, who is the past driver. In this case, it is determined that the accelerator operation does not make the occupant feel uncomfortable. Thus, no warning message is displayed on the meter display 41.

By contrast, an inter-vehicle distance (current operation data) c3 at the start of the accelerator operation is more than the upper-limit line L3*a* in a situation in which depression of the accelerator pedal 70 is started after the preceding vehicle 100 is away from the vehicle 11. In this situation, the current driver starts depressing the accelerator pedal 70 at a longer inter-vehicle distance, that is, at a later acceleration timing, than the occupant, who is the past driver. In other words, in this situation, the inter-vehicle distance (current operation data) c3, which is a numerical value indicating the accelerator operation by the current driver, deviates from the approximate straight line L31, which is the reference data, by an amount more than the warning threshold x3*a*. In this case, it is determined that the accelerator operation makes the occupant feel uncomfortable. A warning message such as “The accelerator operation seems to be slightly late. An earlier accelerator operation is recommended” is displayed on the meter display 41.

An inter-vehicle distance (current operation data) c4 at the start of the accelerator operation is less than the lower-limit line L3*b* in a situation in which depression of the accelerator pedal 70 is started when the preceding vehicle 100 is close to the vehicle 11. In this situation, the current driver starts depressing the accelerator pedal 70 at a shorter inter-vehicle distance, that is, at an earlier acceleration timing, than the occupant, who is the past driver. In other words, in this situation, the inter-vehicle distance (current operation data) c4, which is a numerical value indicating the brake operation by the current driver, deviates from the approximate straight line L31, which is the reference data, by an amount more than the warning threshold x3*b*. In this case, it is determined that the accelerator operation makes the occupant feel uncomfortable. A warning message such as "The accelerator operation seems to be slightly early. A later accelerator operation is recommended" is displayed on the meter display 41.

As illustrated in FIG. 8, if it is determined in step S29 that the inter-vehicle distance indicated by the current operation data is within the allowable range, the process proceeds to step S31 without displaying a warning message. In step S31, the vehicle speed and the vehicle acceleration are detected. Then, in step S32, the vehicle acceleration generated by the accelerator operation by the current driver, that is, the current operation data, is compared with the past operation data related to the vehicle acceleration generated by the occupant, who is the past driver. Then, it is determined whether the vehicle acceleration indicated by the current operation data is outside an allowable range. If it is determined in step S32 that the vehicle acceleration is outside the allowable range, that is, if the vehicle acceleration indicated by the current operation data greatly deviates from that indicated by the past operation data of the occupant, the process proceeds to step S30. In step S30, a warning message is displayed to the current driver. In other words, a warning message for the current accelerator operation is displayed on the meter display 41.

Figure 12:
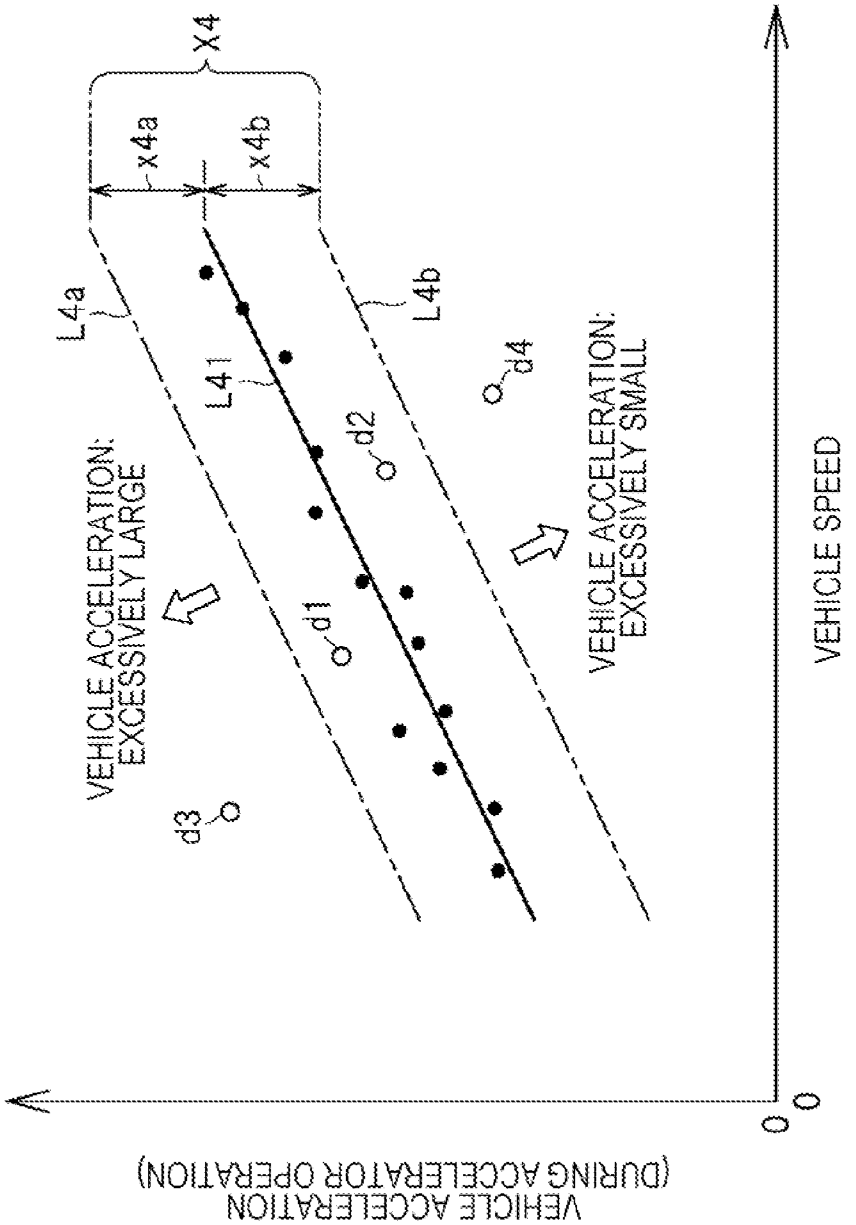
FIG. 12 is a diagram illustrating the example of the past operation data stored in the database.

As indicated by black circles in FIG. 12, the database stores, for the past driver who is the occupant in the vehicle 11, data related to the vehicle speed and the vehicle acceleration obtained at the time of depression of the accelerator pedal 70. In the illustrated example, an approximate straight line L41 is set as past operation data of the past driver, based on multiple pieces of data related to the vehicle speed and the vehicle acceleration. Further, as indicated by the black circles in FIG. 12, when the past operation data includes a number of pieces of data larger than a specified number (for example, 10), the approximate straight line L41 indicating the past operation data is set as reference data to ensure the accuracy of determination using the database. In the illustrated example, an approximate straight line is used. As a non-limiting example, an approximate curve may be used. Further, an upper-limit line L4*a* and a lower-limit line L4*b* are set to define an allowable range X4 for preventing the occupant from feeling too uncomfortable. The upper-limit line L4*a* is obtained by adding a warning threshold x4*a* to the approximate straight line L41. The lower-limit line L4*b* is obtained by subtracting a warning threshold x4*b* from the approximate straight line L41.

As illustrated in FIG. 12, vehicle accelerations (current operation data) d1 and d2 during the accelerator operation fall within the allowable range X4 in a situation in which the current driver depresses the accelerator pedal 70 while generating an approximately equal vehicle acceleration to the occupant, who is the past driver. In this case, it is determined that the accelerator operation does not make the occupant feel uncomfortable. Thus, no warning message is displayed on the meter display 41.

By contrast, a vehicle acceleration (current operation data) d3 during the accelerator operation is more than the upper-limit line L4*a* in a situation in which the vehicle acceleration generated by the accelerator operation by the current driver is excessively larger than the vehicle acceleration generated by the accelerator operation by the occupant, who is the past driver. In other words, in this situation, the vehicle acceleration (current operation data) d3, which is a numerical value indicating the accelerator operation by the current driver, deviates from the approximate straight line L41, which is the reference data, by an amount more than the warning threshold x4*a*. In this case, it is determined that the accelerator operation makes the occupant feel uncomfortable. A warning message such as "The accelerator operation seems to be slightly strong. A weaker accelerator operation is recommended" is displayed on the meter display 41.

A vehicle acceleration (current operation data) d4 during the accelerator operation is less than the lower-limit line L4*b* in a situation in which the vehicle acceleration generated by the accelerator operation by the current driver is excessively smaller than the vehicle acceleration generated by the accelerator operation by the occupant, who is the past driver. In other words, in this situation, the vehicle deceleration (current operation data) d4, which is a numerical value indicating the accelerator operation by the current driver, deviates from the approximate straight line L41, which is the reference data, by an amount more than the warning threshold x4*b*. In this case, it is determined that the accelerator operation makes the occupant feel uncomfortable. A warning message such as "The accelerator operation seems to be slightly weak. A stronger accelerator operation is recommended" is displayed on the meter display 41.

As described above, the control system 50 has a database that stores, for each past driver who drove the vehicle 11 in the past, numerical values indicating the accelerator operation and the brake operation as past operation data. If an occupant other than the current driver matches any past driver, the control system 50 sets the past operation data of the occupant that matches the past driver as reference data. The control system 50 obtains numerical values indicating the accelerator operation and the brake operation by the current driver as current operation data. If the current operation data deviates from the reference data by an amount more than a warning threshold, the control system 50 displays a warning message on the meter display 41. The display of the warning message prompts the driver during driving to perform an accelerator operation or a brake operation such that the accelerator operation or brake operation can be close to the accelerator operation or the brake operation by the occupant. It is possible to reduce the uncomfortable feeling for the occupant.

Figure 13:
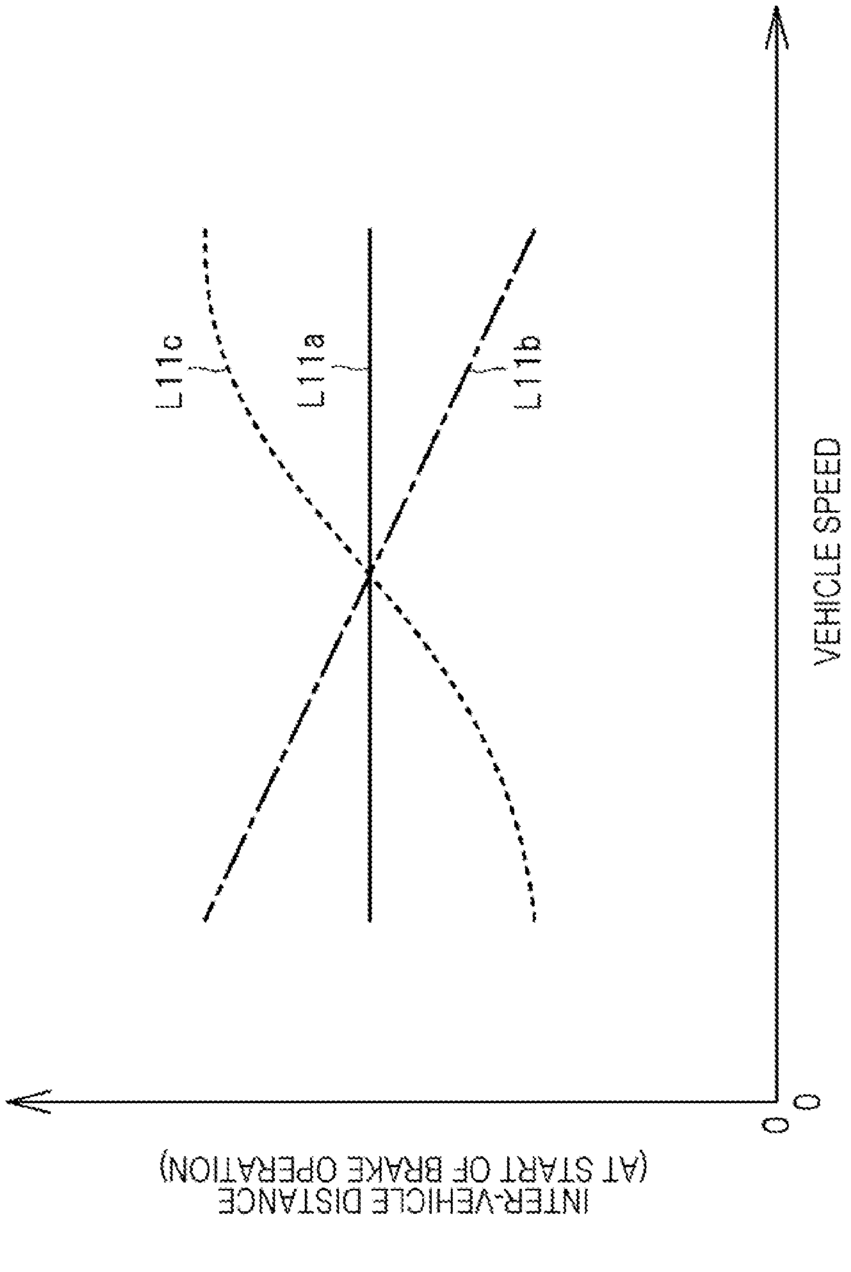
FIG. 13 is a diagram illustrating another example of the past operation data stored in the database.

In FIGS. 9, 10, 11, and 12, the approximate straight lines L11, L21, L31, and L41 are illustrated as past operation data of a past driver. However, the disclosure is not limited to the example illustrated in FIGS. 9, 10, 11, and 12. It is to be understood that the approximate straight line changes depending on the accelerator operation or the brake operation by the past driver. FIG. 13 is a diagram illustrating another example of the past operation data stored in the database. FIG. 13 illustrates past operation data related to vehicle speeds and inter-vehicle distances obtained at the time of depression of the brake pedal 32.

As indicated by a solid line Lila in FIG. 13, some past drivers may keep the inter-vehicle distance (past operation data) at the time of starting to depress the brake pedal 32 constant without changing the inter-vehicle distance in accordance with the vehicle speed. As indicated by a dot-dash line L11*b* in FIG. 13, some past drivers may decrease the inter-vehicle distance (past operation data) at the time of starting to depress the brake pedal 32 as the vehicle speed increases. As indicated by a broken line L11*c* in FIG. 13, some past drivers may increase the inter-vehicle distance (past operation data) at the time of starting to depress the brake pedal 32 in a curved manner in accordance with the vehicle speed. The inter-vehicle distance at the start of the brake operation illustrated in FIG. 13 is an example. In another example, the vehicle deceleration during the brake operation, the inter-vehicle distance at the start of the accelerator operation, or the vehicle acceleration during the accelerator operation changes in accordance with the accelerator operation or the brake operation by the past driver.

In the examples illustrated in FIGS. 9, 10, 11, 12, and 13, the past operation data related to the accelerator operation and the brake operation includes the vehicle speed. However, the disclosure is not limited thereto. In an example, the inter-vehicle distance at the start of the brake operation may be used as the past operation data. In another example, the vehicle deceleration during the brake operation may be used as the past operation data. In another example, the inter-vehicle distance at the start of the accelerator operation may be used as the past operation data. In another example, the vehicle acceleration during the accelerator operation may be used as the past operation data.

Other Embodiments

Figure 14:
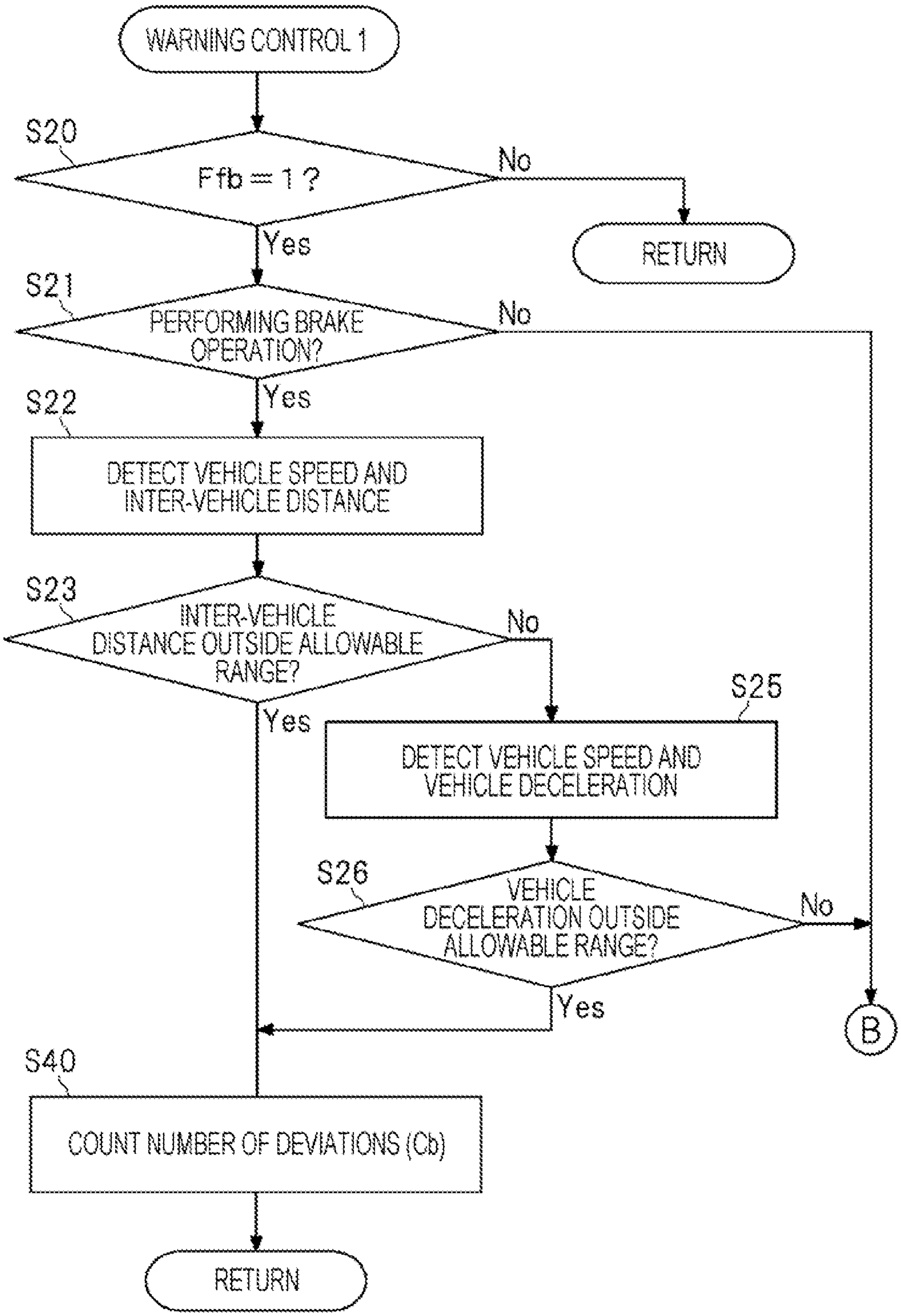
FIG. 14 is a flowchart illustrating another example of warning control.
Figure 15:
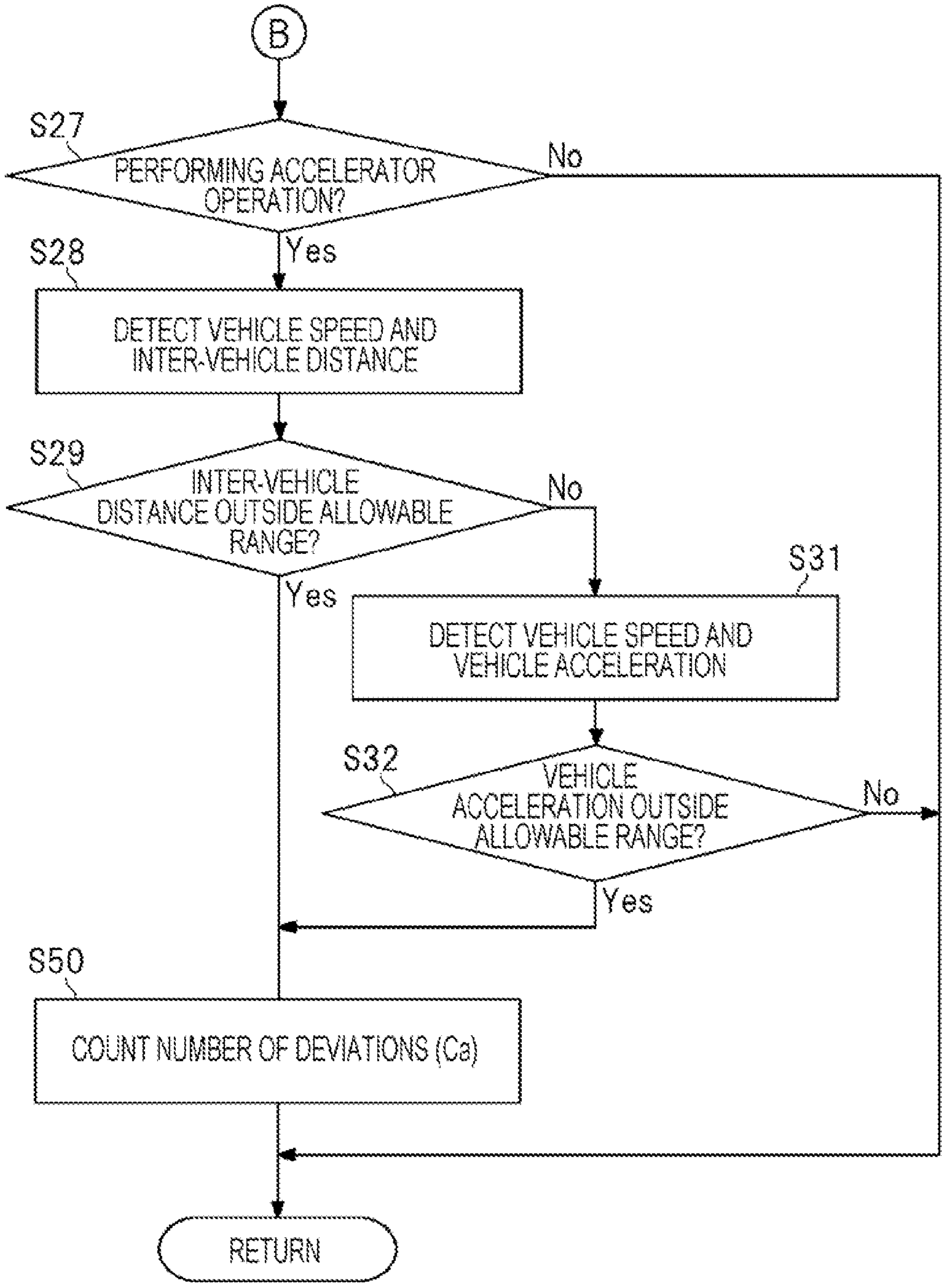
FIG. 15 is a flowchart illustrating the other example of warning control.

In the example illustrated in FIGS. 7 and 8, a warning message is displayed to the current driver immediately when the inter-vehicle distance, the vehicle deceleration, or the vehicle acceleration is outside a predetermined allowable range. As a non-limiting example, a warning message may be displayed to the current driver after the inter-vehicle distance or the like is outside the allowable range multiple times. FIGS. 14, 15, 16, and 17 are flowcharts illustrating warning controls 1 to 3, which are other examples of the warning control. FIGS. 14 and 15 are different from FIGS. 7 and 8, respectively, in the processing of steps S24 and S30 described above. In FIGS. 14 and 15, the other steps denoted by the same reference numerals have same processing. The flowcharts illustrated in FIGS. 14 and 15 are put together at a point denoted by reference character B.

If it is determined in step S23 in FIG. 14 that the inter-vehicle distance is outside the allowable range, that is, if the inter-vehicle distance indicated by the current operation data greatly deviates from that indicated by the past operation data of the occupant, the process proceeds to step S40. In step S40, a process of counting the number of deviations Cb for the brake operation is performed. If it is determined in step S26 that the vehicle deceleration is outside the allowable range, that is, if the vehicle deceleration indicated by the current operation data greatly deviates from that indicated by the past operation data of the occupant, the process proceeds to step S40. In step S40, a process of counting the number of deviations Cb for the brake operation is performed.

If it is determined in step S29 in FIG. 15 that the inter-vehicle distance is outside the allowable range, that is, if the inter-vehicle distance indicated by the current operation data greatly deviates from that indicated by the past operation data of the occupant, the process proceeds to step S50. In step S50, a process of counting the number of deviations Ca for the accelerator operation is performed. If it is determined in step S32 that the vehicle acceleration is outside the allowable range, that is, if the vehicle acceleration indicated by the current operation data greatly deviates from that indicated by the past operation data of the occupant, the process proceeds to step S50. In step S50, a process of counting the number of deviations Ca for the accelerator operation is performed. As described above, the processes of counting the numbers of deviations Ca and Cb for the accelerator operation and the brake operation are performed in accordance with the flowcharts in FIGS. 14 and 15.

Figure 16:
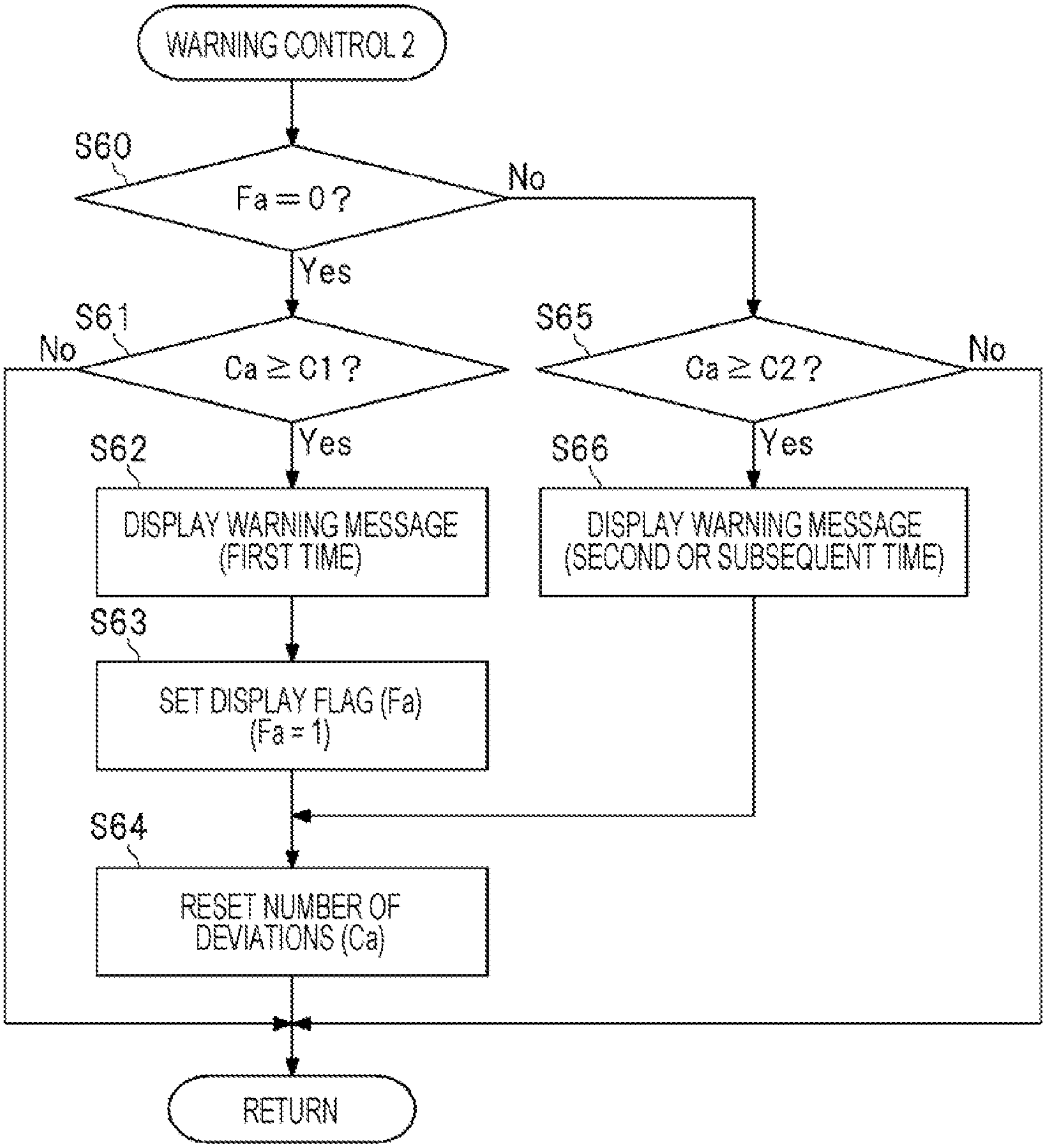
FIG. 16 is a flowchart illustrating another example of warning control.

Next, warning control 2 illustrated in FIG. 16 will be described. As illustrated in FIG. 16, in step S60, it is determined whether a display flag Fa, which will be described below, is cleared, that is, whether "Fa=0" is satisfied. It is determined in step S60 that the display flag Fa is cleared in a situation in which no warning message for an accelerator operation is displayed after the control system 50 is activated. Accordingly, if it is determined in step S60 that the display flag Fa is cleared, the process proceeds to step S61. In step S61, it is determined whether the number of deviations Ca is equal to or more than a first number C1 (for example, 10).

If it is determined in step S61 that the number of deviations Ca is equal to or more than the first number C1, the inter-vehicle distance and the vehicle acceleration are outside the allowable ranges over the predetermined first number C1. Then, the process proceeds to step S62, and a warning message for the accelerator operation is displayed on the meter display 41. After the first warning message for the accelerator operation is displayed in the way described above, the process proceeds to step S63. In step S63, the display flag Fa is set (Fa=1). Then, the process proceeds to step S64, and a process of resetting the number of deviations Ca for the accelerator operation is performed.

On the other hand, if it is determined in step S60 that the display flag Fa is set, the process proceeds to step S65. In step S65, it is determined whether the number of deviations Ca is equal to or more than a second number C2 (for example, 20) larger than the first number C1. If it is determined in step S65 that the number of deviations Ca is equal to or more than the second number C2, the inter-vehicle distance and the vehicle acceleration are outside the allowable ranges over the predetermined second number C2. Then, the process proceeds to step S66, and a warning message for the accelerator operation is displayed on the meter display 41. After the second or subsequent warning message for the accelerator operation is displayed in the way described above, the process proceeds to step S63, and the process of resetting the number of deviations Ca for the accelerator operation is performed. Accordingly, the frequency with which a warning message is displayed can be reduced. Thus, a warning message can be appropriately displayed to the current driver without making the driver feel annoyed.

Figure 17:
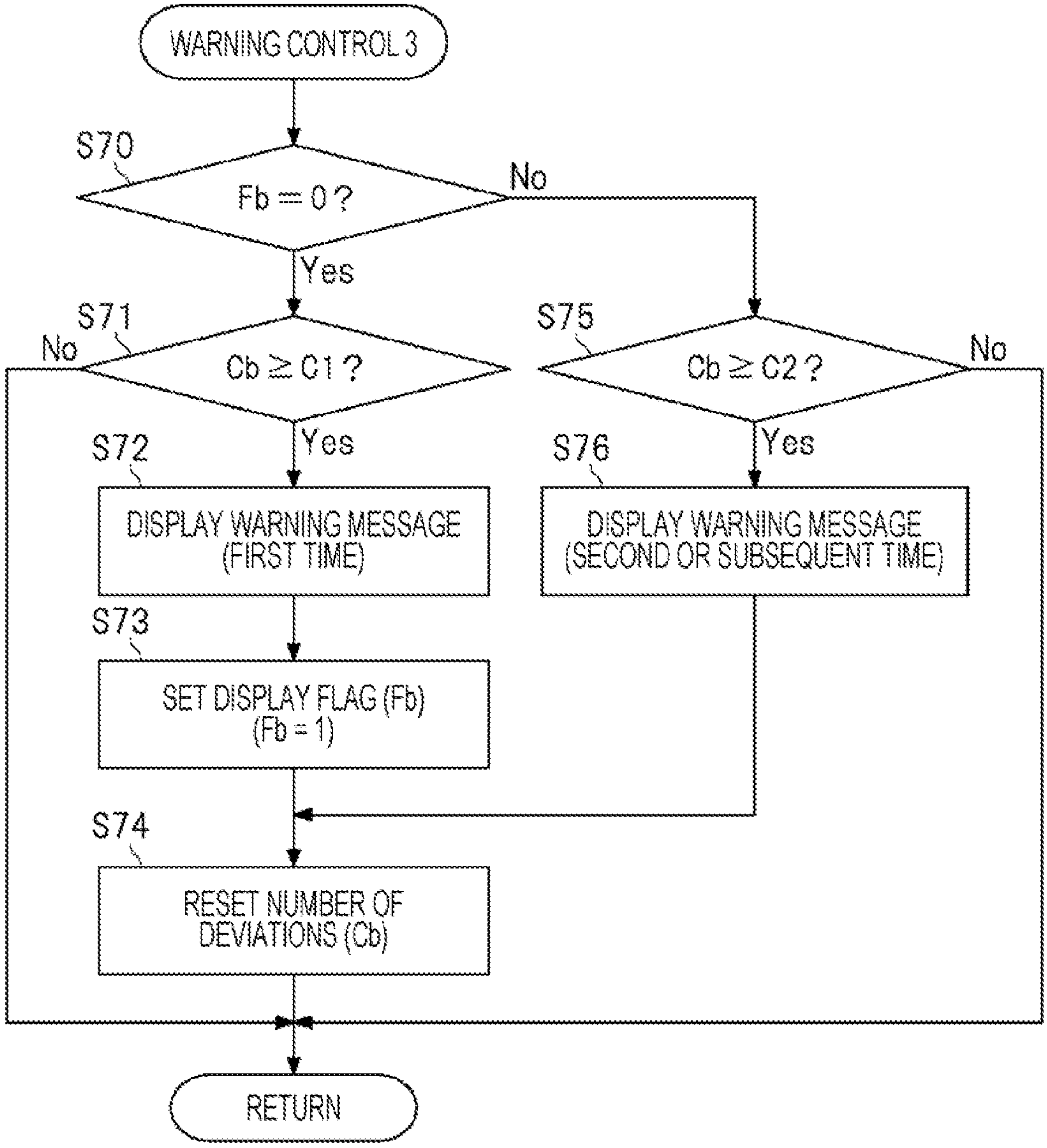
FIG. 17 is a flowchart illustrating another example of warning control.

Next, warning control 3 illustrated in FIG. 17 will be described. As illustrated in FIG. 17, in step S70, it is determined whether a display flag Fb, which will be described below, is cleared, that is, whether "Fb=0" is satisfied. It is determined in step S70 that the display flag Fb is cleared in a situation in which no warning message for a brake operation is displayed after the control system 50 is activated. Accordingly, if it is determined in step S70 that the display flag Fb is cleared, the process proceeds to step S71. In step S71, it is determined whether the number of deviations Cb is equal to or more than a first number C1 (for example, 10).

If it is determined in step S71 that the number of deviations Cb is equal to or more than the first number C1, the inter-vehicle distance and the vehicle acceleration are outside the allowable ranges over the predetermined first number C1. Then, the process proceeds to step S72, and a warning message for the brake operation is displayed on the meter display 41. After the first warning message for the brake operation is displayed in the way described above, the process proceeds to step S73. In step S73, the display flag Fb is set (Fb=1). Then, the process proceeds to step S74, and a process of resetting the number of deviations Cb for the brake operation is performed.

On the other hand, if it is determined in step S70 that the display flag Fb is set, the process proceeds to step S75. In step S75, it is determined whether the number of deviations Cb is equal to or more than a second number C2 (for example, 20) larger than the first number C1. If it is determined in step S75 that the number of deviations Cb is equal to or more than the second number C2, the inter-vehicle distance and the vehicle acceleration are outside the allowable ranges over the predetermined second number C2. Then, the process proceeds to step S76, and a warning message for the brake operation is displayed on the meter display 41. After the second or subsequent warning message for the brake operation is displayed in the way described above, the process proceeds to step S73, and a process of resetting the number of deviations Cb for the brake operation is performed. Accordingly, the frequency with which a warning message is displayed can be reduced. Thus, a warning message can be appropriately displayed to the current driver without making the driver feel annoyed.

It is to be understood that the disclosure is not limited to the embodiment described above and may be changed without departing from the scope of the disclosure. In the foregoing description, the control system 50 includes the control units 24, 25, 37, 42, 46, and 51. As a non-limiting example, the control system 50 may include one control unit. The vehicle 11 is not limited to an electric vehicle including the motor generator 14 as a power source. In an example, the vehicle 11 may be a vehicle including an engine as a power source. In another example, the vehicle 11 may be a hybrid vehicle including an engine and a motor generator as power sources.

In the example illustrated in FIG. 4, the feedback flag Ffb is set in congested traffic. As a non-limiting example, even in non-congested traffic, the feedback flag Ffb may be set if the occupant matches any one of the past drivers on the database, and the warning control for displaying a warning message may be executed. In the foregoing description, the inter-vehicle distance is used as past operation data and current operation data related to the brake operation. As a non-limiting example, a distance to a traffic signal may be used as past operation data and current operation data related to the brake operation. When the traffic signal flashes red indicating a stop, the vehicle 11 stops at the traffic signal. Thus, the distance to the traffic signal may be used in a similar manner to the inter-vehicle distance described above.

In the foregoing description, the depression of the brake pedal 32 is used as the deceleration operation by the current driver or the past driver. As a non-limiting example, clearing the depression of the accelerator pedal 70 is also regarded as the deceleration operation. This is because when the depression of the accelerator pedal 70 is cleared, the motor generator 14 is controlled to be in the regeneration state. In the foregoing description, the vehicle acceleration and the vehicle deceleration are detected by using the acceleration sensor 74. As a non-limiting example, the vehicle acceleration may be estimated from the amount of depression of the accelerator pedal 70, and the vehicle deceleration may be estimated from the amount of depression of the brake pedal 32. In the foregoing description, the driver Dr and the occupant Pa are identified by using the monitoring camera 45. As a non-limiting example, a seating sensor disposed in a seat may be used to identify the occupant from the body weight or body shape. The current driver may operate a touch panel or the like to make a setting for the occupant on board the vehicle. If multiple occupants are past drivers, the occupants may be ranked according to the on-board position, the driving time, or the like to determine an occupant to be used as reference data.

In the foregoing description, a warning message is displayed on the meter display 41 to warn the current driver. As a non-limiting example, a speaker or the like may be used as a warning device to warn the current driver about the accelerator operation or the brake operation by voice or warning sound. In the example illustrated in FIGS. 9 to 12, the allowable ranges X1, X2, X3, and X4 are defined by the upper-limit lines L1*a*, L2*a*, L3*a*, and L4*a* and the lower-limit lines L1*b*, L2*b*, L3*b*, and L4*b*, respectively. As a non-limiting example, the upper-limit lines L1*a*, L2*a*, L3*a*, and L4*a* may be used to define allowable ranges, or the lower-limit lines L1*b*, L2*b*, L3*b*, and L4*b* may be used to define allowable ranges. In the foregoing description, a warning is given for both the accelerator operation and the brake operation. As a non-limiting example, a warning may be given for the accelerator operation, or a warning may be given for the brake operation.

According to an aspect of the disclosure, when an occupant other than a current driver matches any past driver, a control system sets past operation data of the occupant that matches the past driver as reference data. The control system obtains a numerical value indicating one or more of an acceleration operation and a deceleration operation by the current driver as current operation data. When the current operation data deviates from reference data by an amount more than a warning threshold, the control system controls a warning device to warn the current driver. As a result, it is possible to reduce the uncomfortable feeling for the occupant.

The control system 50 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 50 including the battery control unit 24, the motor control unit 25, the brake control unit 37, the meter control unit 42, the driving support control unit 46, and the vehicle control unit 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle control device mountable on a vehicle, the vehicle comprising a vehicle speed sensor configured to detect a travel speed of the vehicle, a front camera configured to capture an image of a scene in front of the vehicle, a front radar configured to detect an obstacle in front of the vehicle, and a monitoring camera configured to detect a current driver who is driving the vehicle and an occupant of the vehicle, the vehicle control device mountable comprising:

a warning device comprising a display or speaker configured to output a warning message to the current driver about one or both of an acceleration operation and a deceleration operation; and a control system configured to control the warning device, the control system comprising a processor and a memory communicably coupled to the processor, wherein the control system is configured to:

detect an inter-vehicle distance between the vehicle and a preceding vehicle traveling in front of the vehicle based on image data of the front camera and distance data of the front radar, and identify the current driver and the occupant based on image data of the monitoring camera;

determine whether the vehicle is in congested traffic, the congested traffic including a situation in which the inter-vehicle distance is lower than a distance threshold and the travel speed is lower than a vehicle speed threshold;

obtain a numerical value indicating one or both of an acceleration operation and a deceleration operation for each of past drivers who drove the vehicle in past, and store the numerical value as past operation data;

when an occupant other than the current driver matches a past driver among the past drivers, set the past operation data of the past driver as reference data;

set a feedback flag in response to determining that (i) the vehicle is in the congested traffic, (ii) an occupant other than the current driver is in the vehicle, and (iii) the past operation data of the occupant other than the current driver is stored;

in response to the feedback flag being cleared, refrain from counting a number of deviations and refrain from providing a first warning and a second warning;

obtain a numerical value indicating one or both of an acceleration operation and a deceleration operation by the current driver as current operation data;

count a number of deviations, the number of deviations being a number of times the current operation data deviates from the reference data by an amount more than a warning threshold, in the congested traffic in which the travel speed of the vehicle is lower than the vehicle speed threshold and the inter-vehicle distance is lower than the distance threshold;

when the number of deviations is equal to or more than a first number, control the warning device to provide a first warning to the current driver, and reset the number of deviations; and when the number of deviations is equal to or more than a second number larger than the first number after the first warning is provided, control the warning device to provide a second warning to the current driver.

2. The vehicle control device according to claim 1, wherein the past operation data comprises an inter-vehicle distance between the vehicle and a preceding vehicle traveling in front of the vehicle at a start of the acceleration operation by the past driver, and the current operation data comprises the inter-vehicle distance between the vehicle and the preceding vehicle traveling in front of the vehicle at a start of the acceleration operation by the current driver.

3. The vehicle control device according to claim 1, wherein the past operation data comprises an inter-vehicle distance between the vehicle and a preceding vehicle traveling in front of the vehicle at a start of the deceleration operation by the past driver, and the current operation data comprises the inter-vehicle distance between the vehicle and the preceding vehicle traveling in front of the vehicle at a start of the deceleration operation by the current driver.

4. The vehicle control device according to claim 1, wherein the past operation data comprises vehicle acceleration during the acceleration operation by the past driver, and the current operation data comprises vehicle acceleration during the acceleration operation by the current driver.

5. The vehicle control device according to claim 1, wherein the past operation data comprises vehicle deceleration during the deceleration operation by the past driver, and the current operation data comprises vehicle deceleration during the deceleration operation by the current driver.

6. The vehicle control device according to claim 1, wherein the control system is configured to set the past operation data as the reference data when the past operation data includes a number of pieces of data more than a predetermined number.

* * * * *